(12) United States Patent
Uemura et al.

(10) Patent No.: US 8,068,397 B2
(45) Date of Patent: *Nov. 29, 2011

(54) RECORDING APPARATUS AND RECORDING METHOD FOR RECORDING POSITION INFORMATION OF USER DATA

(75) Inventors: Kazunori Uemura, Ebina (JP); Yusuke Kazami, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 12/325,325

(22) Filed: Dec. 1, 2008

(65) Prior Publication Data

US 2009/0086594 A1    Apr. 2, 2009

Related U.S. Application Data

(63) Continuation of application No. 11/260,015, filed on Oct. 26, 2005, now Pat. No. 7,529,166.

(30) Foreign Application Priority Data

Oct. 26, 2004    (JP) .................................. 2004-310282

(51) Int. Cl.
*G11B 7/00*    (2006.01)

(52) U.S. Cl. ..................... 369/53.24; 369/53.2; 369/47.1
(58) Field of Classification Search ........................ None
See application file for complete search history.

(56) References Cited

U.S. PATENT DOCUMENTS

2005/0169132 A1    8/2005    Kuraoka et al.

FOREIGN PATENT DOCUMENTS

JP    2002-238015 A    8/2002

*Primary Examiner* — Joseph Haley
(74) *Attorney, Agent, or Firm* — Kilpatrick Townsend & Stockton LLP

(57) ABSTRACT

In a write once type optical disc, when ejecting the disc and turning power OFF, it is necessary to update record management data on the disc so that the record management data on the disc coincide with the record management data on the memory. Here, the update of the record management data on the disc requires a certain time. The present invention provides a user-friendly recording/reproduction apparatus including a unit for judging whether the disc record management information can be updated according to the ratio of the recorded capacity with respect to the recording-enabled capacity. Upon completion of the user data recording, the disc record management information is recorded so that the record management data is not updated when power is turned OFF or the disc is ejected, thereby reducing the time required for the power turning OFF and the disc ejection.

6 Claims, 5 Drawing Sheets

RECORDING APPARATUS AND RECORDING METHOD FOR RECORDING POSITION INFORMATION OF USER DATA

INCORPORATION BY REFERENCE

The present application claims priority from Japanese application JP2004-310282 filed on Oct. 26, 2004, the content of which is hereby incorporated by reference into this application.

BACKGROUND OF THE INVENTION

The present invention relates to a recording method and a recording apparatus for a write once type optical disc in which recording can be performed once in an unrecorded area but the written data cannot be erased for rewrite.

Conventionally, a high-density, a large-capacity reproduction-dedicated optical disc has been developed. Especially, a DVD-ROM (Digital Versatile Disc-Read Only Memory) disc containing video/audio data is widely spread since it can reproduce a high-quality video by an inexpensive reproduction-dedicated DVD player.

On the other hand, recently, there has been developed a write once type optical disc in which data can be written once but the data written cannot be rewritten such as a DVD-R (DVD-Recordable) and as a device for recording data on the write once type optical disc, a video recorder and a video camera are available on market. On this write once type optical disc, data can be additionally written at a time interval and after finalization to complete additional writing, the disc becomes a reproduction-dedicated disc which cannot perform recording any more. Moreover, by recording video data in the DVD video format, it is possible to perform reproduction by a reproduction-dedicated DVD player.

In order to reproduce the write once type optical disc by the DVD player, the final data and the data structure should be in the state compatible with a reproduction-dedicated optical disc. However, the write once type optical disc has a record management area for managing the disc record state at a portion other than the data structure of the reproduction-dedicated optical disc, for example, in the inner circumferential side. That is, in the state before finalization processing when additional write can be performed, the disc record state such as the user data record position is successively recorded in the record management area and when performing the finalization processing, the data is used to create data of the Lead-in area and the Lead-out area, so as to have the same data and data structure as the reproduction-dedicated optical disc, thereby assuring the compatibility.

Hereinafter, the configuration will be detailed further with reference to the drawings. FIG. 2 shows an area structure of a write once type optical disc.

The area of the disc is divided into a disc record management area 201, a Lead-in area 202, a user data record area 203, and a Lead-out area in this order from the innermost circumferential side. In the disc record management area 201, there is successively recorded disc record management information including the position information indicating the reference of the final address of the user data recorded and the disc record information such as record-in-process state and the finalization complete state. Moreover, in the Lead-in area 202 and the Lead-out area 204, disc access information for accessing the disc after the finalization processing is recorded. The disc access information includes a disc record capacity after the finalization processing.

Moreover, in this example, the user data record area 203 is divided into a file system area 205, a video/audio management information area 206, and a video/audio record area 207 in this order from the side of the Lead-in area 202. In the file system area 205, each file position information on the file as a set of video/audio after the finalization processing is recorded. In the video/audio management area 206, management data for managing the video/audio data is successively recorded. The management data includes indefinite video/audio data before performing finalization processing and definite video/audio management data after the finalization processing is performed. In the video/audio record area 207, video/audio data compressed by the MPEG (Moving Picture Experts Group) method is successively recorded.

It should be noted that a trial write area for acquiring the recording power exists in the inner side of the disc record management area 201. However, its explanation is omitted here.

Moreover, among the areas of the write once type optical disc, the disc record management area 201 does not exist in the reproduction-dedicated optical disc. The other areas have the same area structure as in the reproduction-dedicated optical disc and can be used as the reproduction-dedicated disc after the finalization.

In each of the areas of the write once type optical disc, data which has been written cannot be erased to be rewritten. Accordingly, at the stage while user data is additionally recorded on such a disc, the file position information on each file recorded and the final disc recording capacity are not determined. For this, no recording is performed at a part of the Lead-in area 202, the Lead-out area 204, the file system area 205, and part of the video/audio management information area 206 where information for final definition upon finalization is recorded and the disc record management information including the record position information on each area of the user data record area 203 is recorded on the disc record management area 201.

When the power supply to the video/audio recording/reproduction device is turned on or when a disc is inserted, the head position of the unrecorded portion is searched according to the position information indicating the reference of the final address recorded on the disc record management area 201. Here, if the position information recorded on the disc record management area 201 is not newest, unused record positions in the file system area 205, the video/audio management information area 206, and the video/audio record area 207 are searched. During this search, no recording or reproduction can be performed. Accordingly, it is preferable that the newest position information be recorded on the disc record management area 201 upon each recording. However, in the disc record management area 201 also, data which has been written cannot be erased to be rewritten and the area size is limited, which in turn limits the number of additional recording times. Consequently, it is general that the newest information is not recorded for each recording.

For example, if the newest disc record management information is recorded on the disc record management area 201 for each one recording, the disc record management information cannot be updated after recording is performed a predetermined number of times. Especially in the case of a video camera in which a plenty of small video/audio data are recorded, there is a problem that the disc record management information cannot be updated. Moreover, it is possible to limit the recording maximum capacity of the user data record area 203 by the limit for the number of recording times of the disc record management information, but this disabled effective use of the disc capacity. Furthermore, during finalization, in order to inhibit additional write onto the disc any further, the disc record management information is recorded as finalized on the disc record management area 201. That is, an unused area should remain in the record management area 201 even during finalization.

In the conventional technique concerning this problem, the file management information is stored in a memory and according to data write, the file management information in the memory is updated to the newest, so that when power is turned off or the disc (recording medium) is taken out, the file management information updated in the memory is recorded on the disc so as to reduce the number of additional writes of the file management information (see JP-A-2002-238015).

SUMMARY OF THE INVENTION

In the conventional technique of the aforementioned patent document 1, when a disc is taken out or power is turned off after recording user data, the newest disc record management information in the memory is recorded in the disc record management area 201. However, there is a problem that the recording of the newest disc record management information when the disc is taken out or power is turned off requires not a few time. That is, after recording is stopped, the disc rotation is stopped to save power. In order to record the newest disc record management information from this state, firstly, the disc is rotated until the rotation becomes stable and the optical head is moved to the record area before the disc record management information is recorded and then the disc rotation is stopped. At least several seconds (for example, 4 seconds) are required. Especially in the case of a video camera, after a user makes a imaging request, it is preferable that video/audio data be recorded promptly. However, it time is required to take out the disc and turn off power, it is impossible to quickly turn on and insert the disc. That is, quite a time is required before starting recording and an instantaneous shutter chance cannot be gotten.

It is therefore an object of the present invention to provide a disc recording apparatus capable of recording the disc record management information upon completion of user data recording so that recording can be quickly performed when power is turned on and a disc is inserted as well as reducing the processing time required for taking out the disc and turning power off and effectively performing recording on the limited disc record management area.

Another object of the present invention is to provide a recording method using a write once type optical disc having a user data area for recording user data and a record management area for recording user data position information, wherein it is judged whether to record position information concerning the user data in the record management area according to an unrecorded area capacity of the user data area and an unrecorded area capacity of the record management area.

Thus, it is possible to provide a user-friendly disc recording apparatus.

BRIEF DESCRIPTION OF THE DRAWINGS

These and other features, objects and advantages of the present invention will become more apparent from the following description when taken in conjunction with the accompanying drawings wherein.

DESCRIPTION OF THE EMBODIMENTS

Description will now be directed to an embodiment of the present invention with reference to the attached drawings.

Embodiment 1

Figure 2:
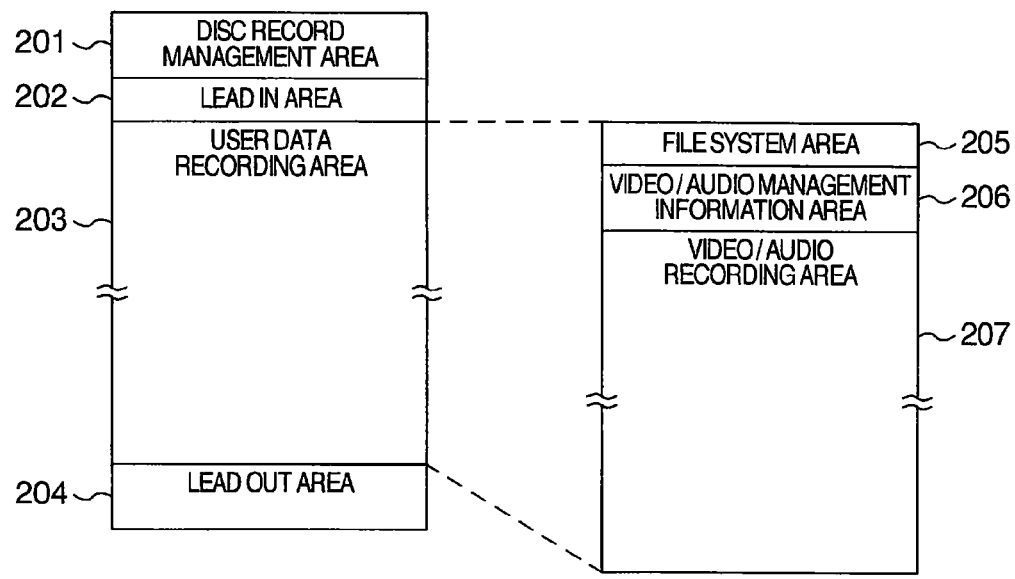
FIG. 2 shows an area structure of the write once type optical disc.

FIG. 2 shows an area structure of a write once type optical disc according to a present embodiment.

The area structure of the write once type optical disc is identical to the structure described in the Background of the Invention and its explanation is omitted here.

Next, explanation will be given on the configuration of the disc recording apparatus according to the present embodiment and the flow of the video/audio data recording processing.

Figure 1:
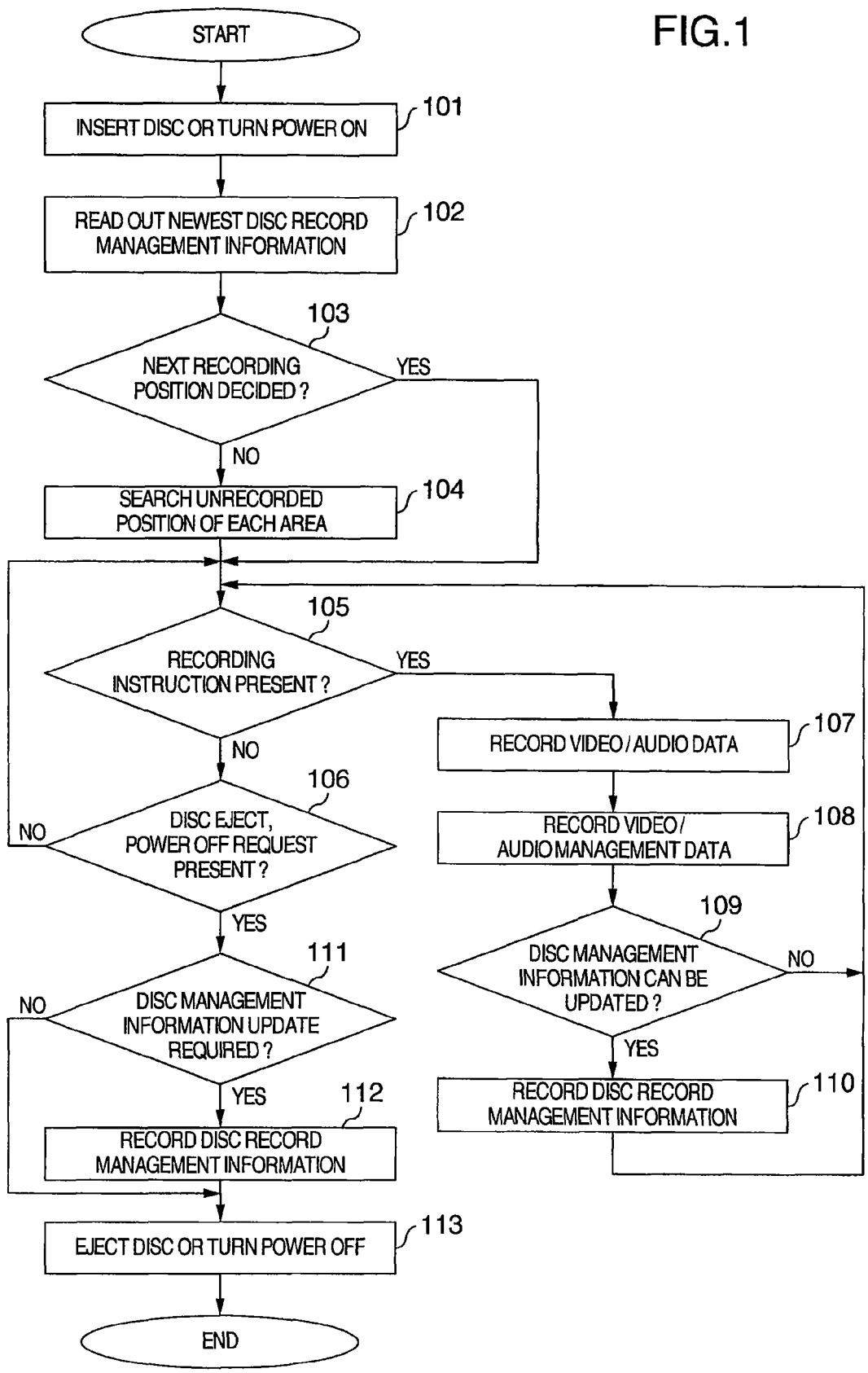
FIG. 1 is a flowchart showing a recording procedure of video/audio data onto a disc according to a present embodiment.
Figure 3:
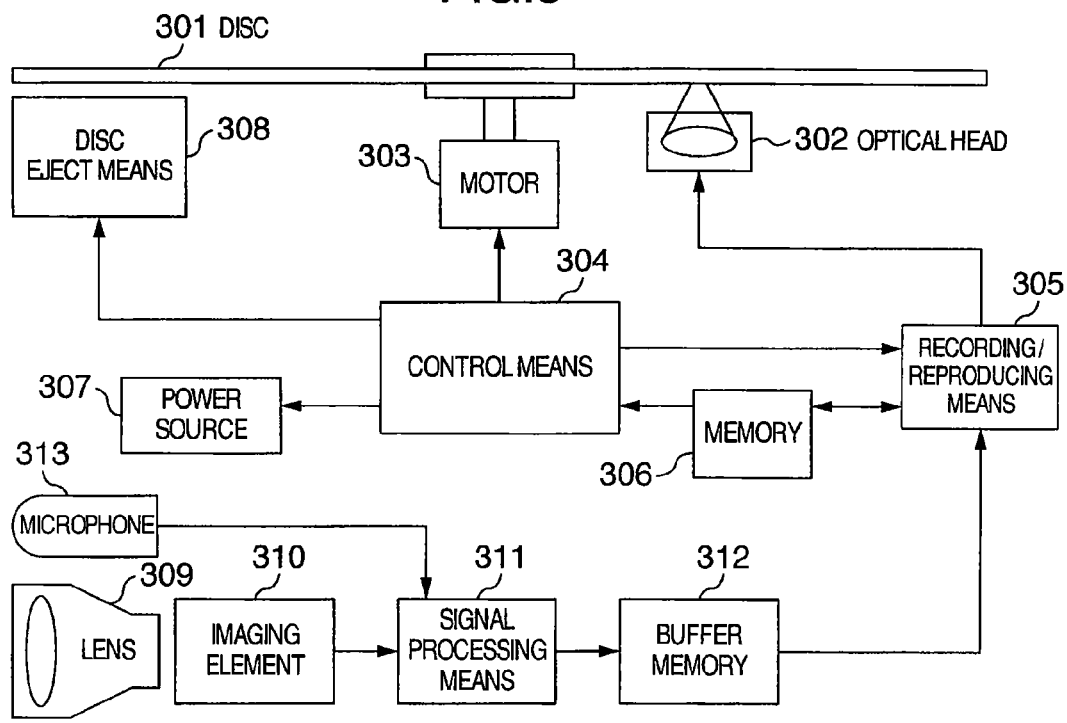
FIG. 3 is a block diagram of a disc recording apparatus according to the present embodiment.

FIG. 1 is a flowchart showing a recording procedure of the video/audio data onto the disc of the present embodiment and FIG. 3 is a block diagram showing a disc recording apparatus of the present embodiment.

Firstly, configuration of the apparatus will be explained with reference to FIG. 3. The reference numeral 301 represents a write once type optical disc as a recording medium, 302 represents an optical head, 303 represents a spindle motor for rotating the disc, 304 represents control means for controlling the entire apparatus, 305 represents recording/reproducing means for recording/reproducing data, 306 represents a memory, 307 represents a power source of the apparatus, 308 represents disc eject means, 309 represents a lens, 310 represents a solid-state imaging element, 311 represents signal processing means, 312 represents a buffer memory, and 313 represents a microphone.

Next, explanation will be given on the flow of recording processing of video/audio data in the present apparatus. In step 101, when a write once type optical disc is inserted or power is turned on, the control means 304 drives the spindle motor so as to rotate the write once type optical disc 301 and perform leaning so as to increase the servo stability. In step 102, the control means 304 instructs the recording/reproducing means 305 to read out the newest disc record management information recorded in the disc record management area 201, and the recording/reproducing means 305 reads out the newest disc record management information from the disc record management area 201 via the optical head 302 and outputs it to the memory 306. Next, in step 103, the control means 304 judges whether the position to be recorded after the file system area 205 and the video/audio management information area 206 and the video/audio recording area 207 is decided.

Here, when the disc record management information is normally recorded in the disc record management area 201 after the user data recording previously and power is turned off with the write once type optical disc 301 not ejected and again power is turned on, no new data is additionally written into the user data record area 203 and the disc record management information stored in the memory 306 is the newest information. Accordingly, the next position for recording is decided according to each area recording end address of the disc record management information stored in the memory 306. In this case, control is passed to step 105 without performing the processing of step 104.

When new data may be additionally written into the user data record area 203 by another apparatus after the record disc record management information is recorded in the disc record management area 201 upon previous recording such as when a new disc is inserted or when the newest disc record management information is not recorded when the disc is ejected or power is turned off, in step 103, the disc record management information read from the disc record management area 201 and store din the memory 306 may not be the newest. Accordingly, the next position for recording in each area is not decided and in step 104, an instruction is issued to search an unrecorded position in the file system area 205 and the video/audio management information area 206, and the video/audio recording area 207. The recording/reproducing means 305 searches an unrecorded position of the file system area 205, the video/audio management information area 206, and the video/audio recording area 207 based on the end address of the user data recorded in each area of the disc record management information stored in the memory 306. Furthermore, the head position of each unrecorded portion as a result of the search is decided as the record head position of each area and the disc record management information stored in the memory 306 is updated. After this, control is passed to step 105. After performing the aforementioned operation, video/audio data can be recorded and reproduced.

It should be noted that in the search of each area in step 104, if the end record address of each area of the disc record management information stored in the memory 306 coincides with the actual end record address of each area, the time required for search is comparatively short. However, as the difference between the end record address of each area of the disc record management information and the actual end record address of each area becomes larger, more time is required for the search processing and the time required until the video/audio data can be recorded and reproduced becomes longer. That is, in order to reduce the time until the recording/reproducing-enabled state can be obtained, it is preferable that the end record address of each area of the newest disc record management information recorded in the disc record management area 201 coincide with the actual end record address of each area.

Step 105 and step 106 are states waiting for an instruction from the user. In step 105, when a video/audio data recording instruction is generated by the user, control is passed to step 107. Here, the light coming from the lens 309 is converted into an electric signal by the solid-state imaging element 310 and inputted as video data to the signal processing means 311. Moreover, audio data may be inputted from the microphone 313 to the signal processing means 311. The signal processing means 311 performs MPEG compression and the video and audio data are accumulated in the buffer memory 312. The control means 304 successively records the video/audio data accumulated in the buffer memory 312 via the recording/ reproducing means 3305 and the optical head 302 in the video/audio recording area 207 of the write once type optical disc 301 starting from the recording head position. With this recording operation, the recording/reproducing means 305 updates the disc record management information stored in the memory 306 to the newest. After this, when a record stop instruction is generated by the user, the input from the signal processing means 311 to the buffer memory 312 is stopped and the video/audio data accumulated in the buffer memory 312 is all recorded in the video/audio recording area 207 before control is passed to step 108.

In step 108, the control means 304 records the video/audio management data up to the present moment at the recording head position of the video/audio management information area 206 of the write once type optical disc 301 via the recording/reproducing means 305 and the optical head 302. With this recording operation, the recording/reproducing means 305 updates the disc record management information stored in the memory 306.

Next, in step 109, the control means 304 makes a first judgment whether the newest disc record management information can be recorded in the disc record management area 201. When it is judged that the newest disc record management information can be recorded, control is passed to step 110 where the control means 304 records the newest disc record management information stored in the memory 306 in the record head position of the disc record management area 201 of the write once type optical disc 301 via the recording/reproducing means 305 and the optical head 302 before control is passed to step 105. In step 109, when it is judged that the newest disc record management information cannot be recorded, control is passed to step 105 without performing the process of step 110. It should be noted that the first judgment method will be detailed later with reference to FIG. 6 and FIG. 7.

When video/audio data is recorded subsequently, series of processes of step 107*b* and after are repeated.

Moreover, when a record start instruction is issued from the user during recording of the video/audio management data to the video/audio management information area 206 in step 108 or during recording of thee disc record management information to the disc record management area 201 in step 110, the input from the signal processing means 311 to the buffer memory 312 is resumed and accumulated. After the processes of step 108 and step 110 are complete, control is passed to step 107, where the video and audio data accumulated in the buffer memory 312 are recorded in the video/ audio recording area 207, thereby resuming the recording without making the user wait.

It should be noted that considering the case when power supply is cut off by an unexpected power failure, during recording to the video/audio recording area 207 in step 107, for example, it is possible to record the newest disc record management information into the record management area 201 each time a predetermined data capacity is recorded into the video/audio recording area 207.

Next, if no recording instruction is issued in step 105, control is passed to step 106, where if a disc ejection or a power off instruction is generated by the user, control is passed to step 111.

In step 111, the control means 304 makes a second judgment whether to record the newest disc record management information in the disc record management area 201. If it is judged that the newest disc record management information is to be recorded, control is passed to step 112, where the control means 304 records the newest disc record management information stored in the memory 306 at the record head position of the disc record management area 201 of the write once type optical disc 301 via the recording/reproducing means 305 and the optical head 302 before control is passed to step 113. If it is judged that the newest disc record management information is not to be recorded, control is passed to step 113 without performing the process of step 112.

In step 113, the control means 304 ejects the disc via the disc eject means 308 when the user instruction is disc ejection. When the user instruction is power off, the power of the power source 307 of the apparatus is turned off. It should be noted that the second judgment method will be detailed later.

Figure 4:
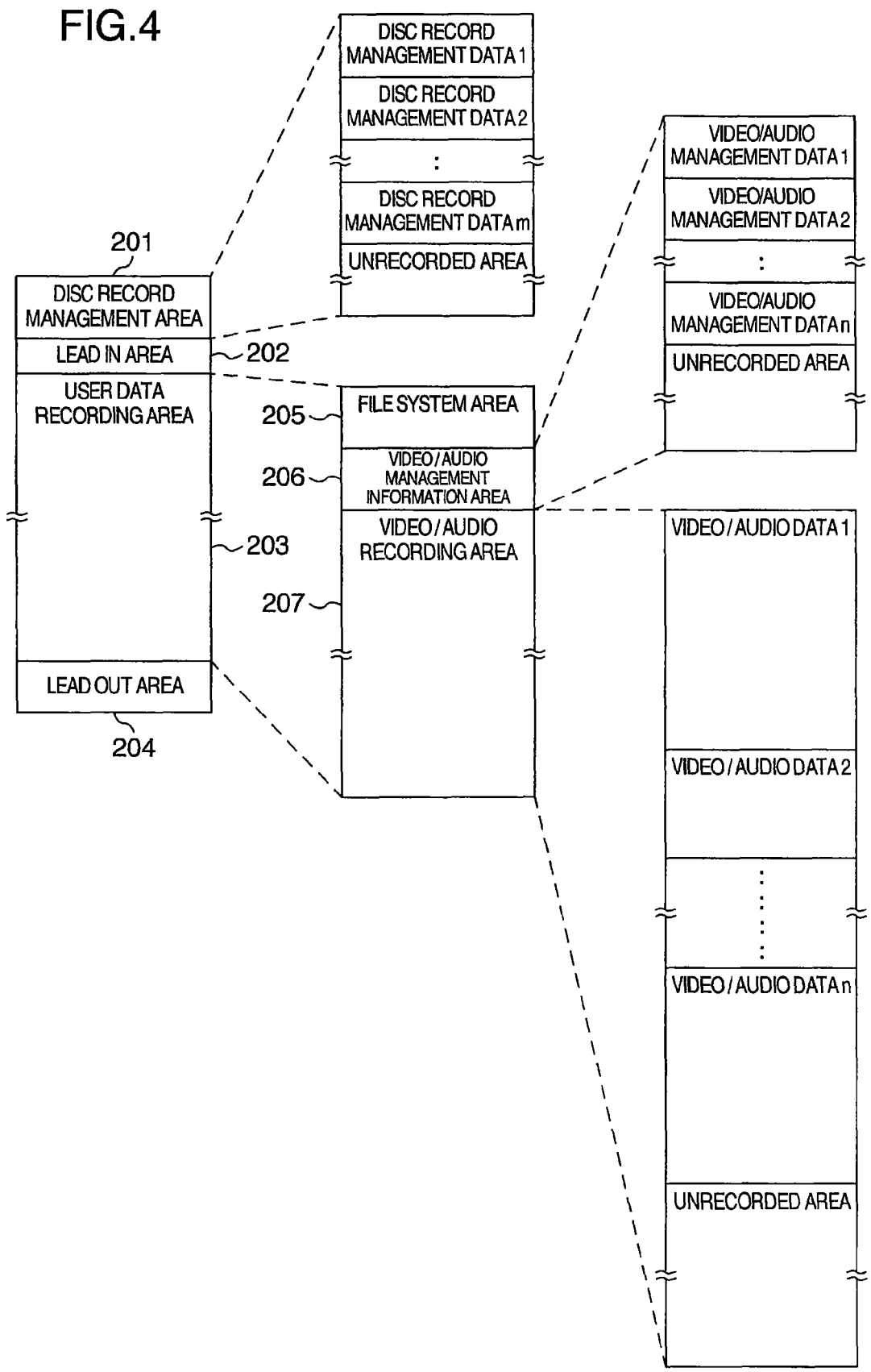
FIG. 4 shows an area structure indicating the state of the respective areas of the write once type optical disc in the writable state before performing finalization.

Referring to FIG. 4, explanation will be given on each recording area state in the stage when video/audio information is recorded on the write once type optical disc. FIG. 4 shows an area structure indicating the state of each area of the write once type optical disc in the writable state for recording video/audio information before finalization. In this embodiment, it is assumed that the video/audio information is recorded n times and recording of the disc record management information by the disc eject or power off is performed m times.

Video/audio data is recorded n times in the video/audio recording area 207 and video/audio management data is recorded n times in the video/audio management information area 206.

Moreover, the disc record management information is recorded m times in the disc record management area 201. The other portions are unrecorded.

Figure 5:
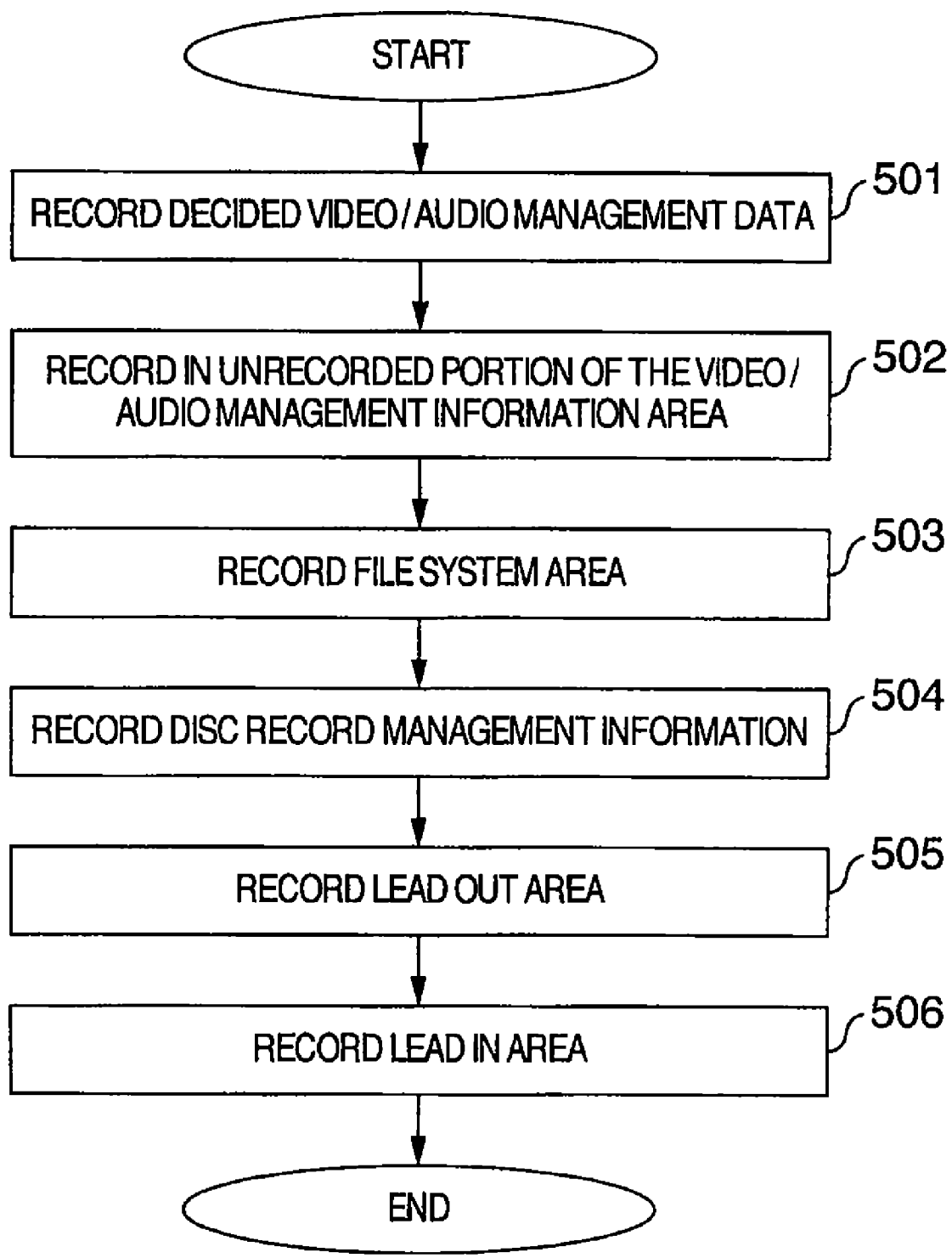
FIG. 5 is a flowchart showing a finalization procedure.

Next, explanation will be given on the finalization procedure. FIG. 5 is a flowchart showing a finalization procedure.

When a finalization execution instruction is received from the user, the control means 304 records, in step 501, the video/audio management data finally determined at the record head position of the unrecorded area of the video/audio management information area 206 of the write once type optical disc 301 and, in step 502, records dummy data such as NULL data in all the remaining unrecorded portions of the video/audio management information area 206. In step 503, the control means 304 records the final file position information in the file system area 205 of the write once type optical disc 301 via the recording/reproducing means 305 and the optical head 302. Next, in step 504, the control means 304 records the disc record management information containing the disc write-disabled information at the record head position of the unrecorded area of the disc record management area 201 of the write once type optical disc 301 via the recording/reproducing means 305 and the optical head 302.

In step 505, the disc record management information or the like is recorded in the unrecorded area next to the final record position as a Lead-out area 204. In step 506, data to be recorded in the Lead-in area 202 is created according too the newest disc record management information and recorded in the Lead-in area 202.

It should be noted that here if finalization is to be performed, it is necessary to assure an unrecorded area capable of recording the at least one disc record management information in the record management area 201. The assuring method will be detailed later.

It should be noted that, the processing order of steps 501 to 506 may be changed if the final disc data structure is identical.

Next, referring to FIG. 6, explanation will be given on the first judgment method in step 109.

In step 109, it is preferable to judge that the disc record management information is to be recorded while considering the limit number of recording times of the disc record management information according to the size of the disc record management area 201.

Here, attention is paid on the recorded ratio of the video/audio recording area 207 and the recorded ratio of the disc record management information. The recorded ratio of the video/audio recording area 207 represents a ratio of recording capacity of the video/audio data already recorded with respect to the maximum recording capacity of the video/audio recording area 207. The recorded ratio of the disc record management information represents a ratio of the number of disc record management information recordings already recorded with respect to the maximum recording number of the disc record management information to the disc record management area 201.

Figure 6:
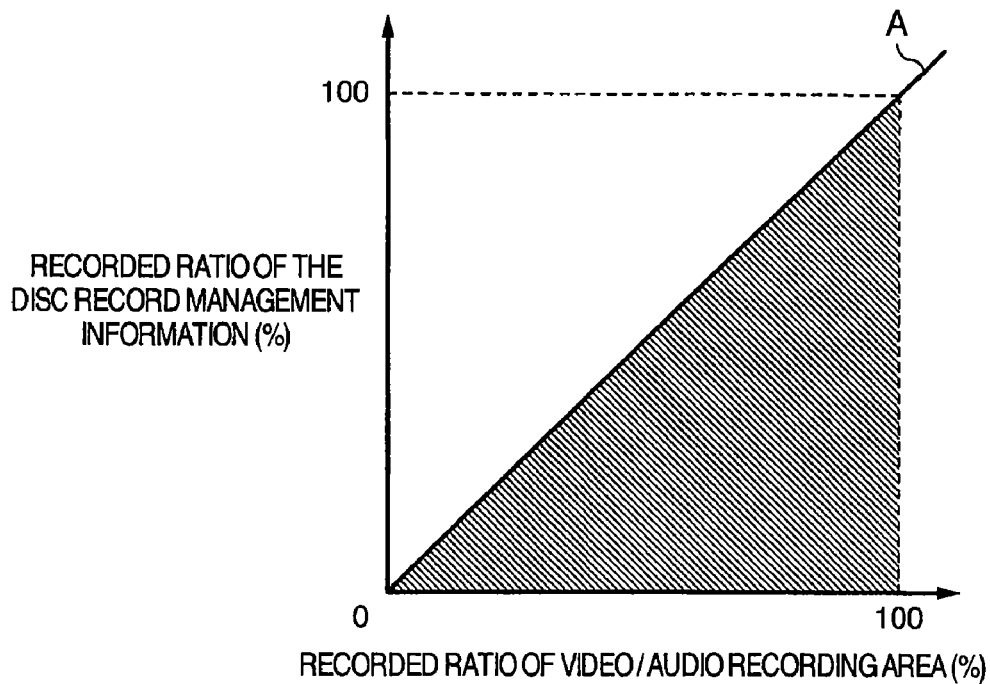
FIG. 6 is a graph showing relationship between the recorded ratio of the video/audio recording area and the recorded ratio of the disc record management information.

FIG. 6 is a graph showing the relationship between the recorded ratio of the video/audio recording area 207 and the recorded ratio of the disc record management information. The horizontal axis represents the recorded ratio of the video/audio recording area 207 and the vertical axis represents the recorded ratio of the disc record management information.

Here, when the relationship between the recorded ratio of the video/audio recording area 207 and the recorded ratio of the disc record management information is above the line A, it means that more disc record management information is recorded than the video/audio recording. That is, if recording to the disc record management area 201 continues while maintaining this ratio, the capacity of the disc record management area 201 is used up before using up the capacity of the video/audio recording area 207 and there is a high possibility that the disc record management information cannot be recorded to the disc record management area 201 any more.

On the contrary, when the relationship between the recorded ratio of the video/audio recording area 207 and the recorded ratio of the disc record management information is below the line A, it means that less disc record management information is recorded than the video/audio recording. That is, if this ratio is maintained, even if recording to the disc record management area 201 is performed, there is no possibility that capacity of the disc record management area 201 is used up before using up the capacity of the video/audio recording area 207 and it is possible to effectively use the maximum recording capacity of the video/audio recording area 207.

That is, in step 109, when the relationship between the recorded ratio of the video/audio recording area 207 and the recorded ratio of the disc record management information is on the line A or below the line A, it is judged that further disc record management information can be recorded without leaving the recording capacity of the video/audio recording area 207 in vain.

The aforementioned can be expressed by Expression 1.1 as follows.

$$(b1/b2)/(a1/a2) \leq 1 \qquad \text{Expression 1.1}$$

wherein a1 is a video/audio data capacity already recorded, a2 is the maximum recording capacity of the video/audio recording area 207, b1 is the number of disc record management information already recorded, and b2 is the maximum recording number of the disc record management information to the disc record management area 201.

When Expression 1.1 is satisfied, it can be judged that it is possible to record the disc record management information in the disc record management area 201.

Here, when the disc record management information may be recorded by the judgment of Expression 1.1 and as a result, the relationship may exceed the line A in FIG. 6. Considering this case, in order to set the result of recording of the disc record management information on the line A or below the line A, it is possible to use Expression 1.2 in which the number of disc record management information already recorded b1 is added by 1 for the next disc record management information to be recorded.

$$((b1+1)/b2)/(a1/a2) \leq 1 \quad \text{Expression 1.2}$$

Furthermore, if it is considered that in the finalization process, it is necessary to assure an unrecorded area capable of recording at least one disc record management information, it is possible to use Expression 1.3 in which the number of disc record management information already recorded b1 is further added by 1.

$$((b1+2)/b2)/(a1/a2) \leq 1 \quad \text{Expression 1.3}$$

Furthermore, there is a case that the disc record management information is recorded in the disc record management area 201 by the second judgment in step 111 or recording is repeated at the next unrecorded position of the disc record management area 201 when normal recording at the head of the unrecorded area of the disc record management area 201 has failed due to contamination of the disc. For such a case, a backup area should be assured in the record management area 201. When considering this, Expression 1.4 can be used.

$$((b1+\alpha)/b2)/(a1/a2) \leq 1 \quad \text{Expression 1.4}$$

wherein $\alpha$ is a disc record management information recording backup number ($\alpha >= 2$).

In this embodiment, Expression 1.4 is used as the first judgment reference. When Expression 1.4 is satisfied in step 109, control is passed to step 110, where the newest disc record management information is recorded at the record head position of the disc record management area 201. Then, control is passed to step 105. When Expression 1.4 is not satisfied in step 109, control is passed to step 105 without performing the process of step 110.

Here, in this embodiment, Expression 1.4 is used as the first judgment reference. However, when no backup area is required for finalization and the like, it is possible to use any of Expression 1.1, Expression 1.2, and Expression 1.3.

Next, explanation will be given on the second judgment method in step 111.

In step 111, the disc record management information recorded in the disc record management area 201 immediately before is compared to the disc record management information stored in the memory 306. If their disc record management information coincide with each other, it is judged not to record the newest disc record management information and control is passed to step 113 without performing the process of step 112. That is, after the recording of video/audio information is stopped, if the newest disc record management information is recorded in step 110 according to the first judgment in step 109, the process of step 112 is not required, which reduces the time required until the disc is ejected and the power is actually turned off.

Moreover, after the recording of video/audio information is stopped, if the process of step 110 is not performed according to the first judgment in step 109, the newest disc record management information is not recorded on the disc record management area 201. Accordingly, if the start time is considered when the disc is inserted and the power is turned on for the next time, it is preferable that the newest disc record management information be recorded. Consequently, it is judged to record the newest disc record management information, and it is recorded at the record head position of the disc record management area 201 of the write once type optical disc 301 before control is passed to step 113.

Here, in the finalization process, if it is considered that an unrecorded areas capable of recording at least one disc record management information should be assured, judgment may be made by Expression 2.1 as follows.

$$b4 > 1 \quad \text{Expression 2.1}$$

wherein b4 is the remaining number of disc record management information which can be recorded in the disc record management area 201.

Furthermore, normal recording may not be performed at the head of the unrecorded area of the disc record management area 201 due to contamination of the disc or the like and recording should be performed again in the next unrecorded position of the disc record management area 201. For this, it should be considered to assure a backup area in the disc record management area 201. In this case, it is possible to use Expression 2.2 as follows.

$$b4 > \beta \quad \text{Expression 2.2}$$

wherein $\beta$ is the backup number of the disc record management information ($\beta \geq 1$).

In this embodiment, Expression 2.2 is the reference of the second judgment. In step 111, if the newest disc record management information is not recorded in the disc record management area 201 and Expression 2.2 is satisfied, control is passed to step 112, where the newest disc record management information is recorded in the disc record management area 201 and control is passed to step 113. If Expression 2.2 is not satisfied, control is passed to step 113 without performing the process of step 112.

Here, in this embodiment, Expression 2.2 is used as a reference of the second judgment. However, when no backup area is required, it is possible to use Expression 2.1.

Lastly, explanation will be given on the recording condition of the disc record management information in the finalization process. The finalization process does not require any judgment according to a condition since no additional write is performed after the finalization process. In step 504, the disc record management information including the disc record information such as completion of the finalization process is recorded in the record management area 201 without fail. Here, according to the first judgment and the second judgment in the embodiment, the record management area 201 has an unrecorded area for recording the disc record management information.

As has been described above, there is provided a user-friendly disc recording apparatus having means for judging whether update of the disc record management information is enabled according to the ratio of the recorded capacity with respect to the recordable capacity so as to appropriately judge the condition for recording the disc record management information. Upon completion of user data recording, the disc record management information is recorded if possible so as to effectively perform recording in the limited disc record management area and reduce the time required for disc ejection and power turning OFF. When the power is turned ON and the disc is inserted next time, recording can be rapidly performed.

Moreover, in the finalization process, it is possible to assure an area for recording the disc record management information and perform the finalization process.

Embodiment 2

Explanation will be given on the first judgment method in the disc recording apparatus according to a second embodiment. The disc recording apparatus according to the second embodiment has the same configuration as the one according to the first embodiment and the recording procedure and recording method are also identical as those of the first embodiment. Their explanations are omitted here.

Here, the reference is considered to be the moment when the disc record management information was recorded during the previous recording. Attention is paid on the addition ratio which is the ratio of the recording capacity of the video/audio data additionally recorded with respect to the remaining recording-enabled capacity of the unrecorded area of the video/audio recording area 207 at the moment when the disc record management information was recorded during the previous recording and to the addition ratio which is the ratio of the number of the disc record management information recordings when the next disc record management information to be recorded was additionally recorded with respect to the remaining recording-enabled number of the unrecorded area portion of the disc record management area 201 at the moment when the disc record management information was recorded during the previous recording.

It should be noted that recording of the disc record management information during the previous recording includes not only the recording by the present disc recording apparatus in step 110 and step 112 but also recording performed by other disc recording apparatus.

Figure 7:
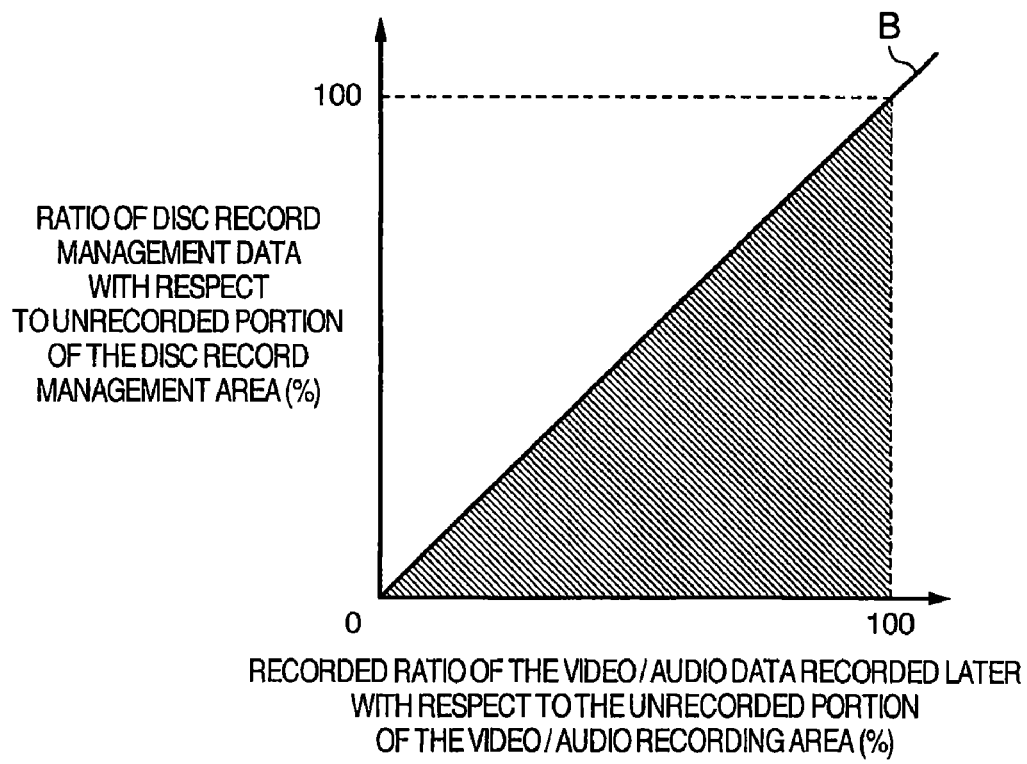
FIG. 7 is a graph showing a relationship between the addition ratio of the video/audio recording area based on the moment when the disc record management information has been recorded previously and the addition ratio when the record management data is recorded.

FIG. 7 is a graph showing the relationship between the addition ratio which is the ratio of the recording capacity of the video/audio data additionally recorded with respect to the remaining recording-enabled capacity of the unrecorded area portion of the video/audio recording area 207 according to the reference when the disc record management information was recorded previously and the addition ration which is the ratio of the number of disc record management information recordings when the next disc record management data to be recorded was additionally recorded with respect to the remaining recording-enabled number of the unrecorded area portion of the disc record management area 201. The horizontal axis represents the addition ratio which is the ratio of the video/audio data recording capacity which was additionally recorded with respect to the remaining recording/enabled capacity of the unrecorded area portion of the video/audio recording area 207. The vertical axis represents the addition ratio which is the ratio of the number of the disc record management information recordings when the next disc record management data to be recorded was additionally recorded with respect to the remaining recording-enabled number of the unrecorded area portion of the disc record management area 201.

Here, when the relationship between the addition ratio which is the ratio of video/audio data recording capacity additionally recorded with respect to the remaining recording-enabled capacity of the unrecorded area portion of the video/audio recording area 207 and the addition ratio which is the ratio of the number of the disc record management information recordings when the next disc record management data to be recorded was recorded with respect to the remaining recording-enabled number of the unrecorded area portion of the disc record management area 201 is above the line B, this means that a plenty of disc record management information is recorded as compared to the video/audio recording performed later than the reference which is the moment when the disc record management information was recorded during the previous recording. That is, when the relationship is above the line B and recording to the disc record management area 201 is further performed, there is a case that the capacity of the disc record management area 201 is used up before finally using up the capacity of the video/audio recording area 207.

On the contrary, when the relationship between the addition ratio which is the ratio of video/audio data recording capacity additionally recorded with respect to the remaining recording-enabled capacity of the unrecorded area portion of the video/audio recording area 207 and the addition ratio which is the ratio of the number of the disc record management information recordings when the next disc record management data to be recorded was recorded with respect to the remaining recording-enabled number of the unrecorded area portion of the disc record management area 201 is below the line B, this means that only a small amount of disc record management information is recorded as compared to the video/audio recording performed later than the reference which is the moment when the disc record management information was recorded during the previous recording. When this ratio is maintained, even if recording is performed into the disc record management area 201, there is no case that the recording capacity of the disc record management area 201 is used up before using up the capacity of the video/audio recording area 207. Thus, it is possible to effectively use the maximum recording-enabled capacity of the video/audio recording area 207.

That is, in step 109, when the relationship between the addition ratio of the video/audio recording area 207 and the addition ratio of the disc record management information is on the line B or below the line B, it can be judged that it is possible to further record the disc record management information without leaving the recording capacity of the video/audio recording area 207 in vain.

The aforementioned can be expressed by Expression 3.1 as follows.

$$(b3/b4)/(a3/a4) \leq 1 \qquad \text{Expression 3.1}$$

wherein a3 represents video/audio data capacity recorded from the moment when the record management information was recorded previously; a4 represents a remaining recording capacity of the video/audio recording area at the moment when the disc record management information was recorded previously; b3 represents the next number of disc record management information to be recorded (that is, 1); and b4 represents the remaining recording-enabled number of the disc record management information in the disc record management area 201.

When Expression 3.1 is satisfied, it can be judged that disc record management information can be recorded in the disc record management area 201.

Furthermore, in the finalization process, if it is considered to assure an unrecorded area capable of recording at least one disc record management information, it is possible to use Expression 3.2 where the number of disc record management information recordings b3 is added further by 1.

$$((b3+1)/b4)/(a3/a4) \leq 1 \qquad \text{Expression 3.2}$$

Furthermore, Expression 3.3 can be used when considering to assure a backup area in the record management area 201 for the case when the disc record management information is recorded in the disc record management area 201 or when normal recording has failed at the head of the unrecorded area of the disc record management area 201 and recording is again performed at the next unrecorded position of the disc record management area 201.

$$((b3+\gamma)/b4)/(a3/a4) \leq 1 \qquad \text{Expression 3.3}$$

wherein γ is the backup number of the disc record management information recording (γ≧1).

In the second embodiment, Expression 3.3 is used as the first judgment reference. When Expression 3.3 is satisfied in step 109, control is passed to step 110, where the newest disc record management information is recorded at the record head position of the disc record management area 201 before control is passed to step 105. When Expression 3.3 is not satisfied in step 109, control is passed to step 205 without performing the process of step 110.

Here, the present embodiment uses Expression 3.3 as the reference of the first judgment. However, even no backup area is required, Expression 3.1 or Expression 3.2 may be used.

As has been described above, there is provided means for judging whether update of the disc record management information can be performed according to the ratio of the recorded capacity with respect to the recording-enabled capacity, thereby appropriately judging the condition for recording the disc record management information and recording the disc record management information upon completion of the user data recording. Thus, it is possible to provide a user-friendly disc recording device capable of effectively performing recording in the limited disc record management area, reducing the processing time required for disc ejection and power turning OFF, and rapidly starting recording when power is turned ON and the disc is inserted next time.

Moreover, in the finalization process, it is possible to assure an area for recording the disc record management information and perform the finalization process.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

The invention claimed is:

1. A recording method using a write once type recording medium, the recording medium comprising
  a user data area for recording user data, and
  a record management area for recording user data position information,
  wherein judgment is made whether to record the position information concerning the user data in the record management area according to:
    an unrecorded capacity of the user data area,
    an unrecorded capacity of the record management area,
    the ratio of the recorded capacity of the user data area against the user data capacity additionally recorded later, and
    the ratio of the recorded capacity of the record management area against the management information capacity to be additionally recorded later.

2. A recording method using a write once type recording medium, the recording medium comprising
  a user data area for recording user data, and
  a record management area for recording user data position information,
  wherein judgment is made whether to record position information concerning the user data in the record management area according to both:
    an unrecorded capacity of the user data area, and
    an unrecorded capacity of the record management area:
  wherein:
    after the user data is recorded in the user data area, the position information indicating the end address of the user data is stored in a memory, and
    when the write once type recording medium is ejected, the position information stored in the memory is compared to the position information to be recorded in the record management area so as to judge whether to update the record management area.

3. A recording method using a write once type recording medium, the recording medium comprising
  a user data area for recording user data, and
  a record management area for recording user data position information,
  wherein judgment is made whether to record position information concerning the user data in the record management area according to both:
    an unrecorded capacity of the user data area, and
    an unrecorded capacity of the record management area;
  wherein:
    after the user data is recorded in the user data area, the position information indicating the end address of the user data is stored in a memory, and
    when power of a device in which the write once type recording medium is used is turned OFF, the position information stored in the memory is compared to the position information to be recorded in the record management area so as to judge whether to update the record management area.

4. A recording method as claimed in claim 3, wherein the device is a video camera.

5. A recording device using a write once type recording medium comprising:
  a user data area for recording user date, and
  a record management area for recording user data position information,
  the recording device comprising:
    read means for reading data from the write once type recording medium; and
    judging means for judging whether to record position information concerning the user data in the record management area according to both:
      an unrecorded capacity of the user data area,
      an unrecorded capacity of the record management area;
    a memory for storing the position information indicating the end address of the user data after recording the user data in the user data area, and
    comparison means for comparing the position information stored in the memory to the position information to be recorded in the record management area,
    wherein when the write once type optical disc is ejected, judgment is made whether to update the record management area according to the comparison of the comparison means.

6. A recording device using a write once type recording medium comprising:
  a user data area for recording user date, and
  a record management area for recording user data position information,
  the recording device comprising:
    read means for reading data from the write once type recording medium; and
    judging means for judging whether to record position information concerning the user data in the record management area according to both:
      an unrecorded capacity of the user data area,
      an unrecorded capacity of the record management area;
    a memory for storing the position information indicating the end address of the user data after recording the user data in the user data area, and
    comparison means for comparing the position information stored in the memory to the position information to be recorded in the record management area,
    wherein when power of the recording device is turned OFF, judgment is made whether to update the record management area according to the comparison of the comparison means.

* * * * *